(12) United States Patent
Yoon

(10) Patent No.: US 8,755,115 B2
(45) Date of Patent: Jun. 17, 2014

(54) 3D IMAGE PROJECTION SYSTEM

(75) Inventor: Youngshik Yoon, Valencia, CA (US)

(73) Assignee: Thomson Licensing, Boulogne-Billancourt (FR)

(*) Notice: Subject to any disclaimer, the term of this patent is extended or adjusted under 35 U.S.C. 154(b) by 1273 days.

(21) Appl. No.: 12/448,322

(22) PCT Filed: Dec. 19, 2006

(86) PCT No.: PCT/US2006/048321
§ 371 (c)(1),
(2), (4) Date: Jun. 17, 2009

(87) PCT Pub. No.: WO2008/076111
PCT Pub. Date: Jun. 26, 2008

(65) Prior Publication Data
US 2010/0026909 A1    Feb. 4, 2010

(51) Int. Cl.
G03B 21/56    (2006.01)
G03B 21/60    (2014.01)
G02F 1/1333   (2006.01)
G02F 1/1343   (2006.01)

(52) U.S. Cl.
USPC ............. 359/443; 359/458; 359/460; 349/56; 349/146

(58) Field of Classification Search
CPC ........ G03B 21/56; G03B 21/60; G03B 35/24; G03F 1/136
USPC ........... 348/744; 359/443, 453, 456, 457, 458
See application file for complete search history.

(56) References Cited

U.S. PATENT DOCUMENTS

| 5,949,390 | A | 9/1999 | Nomura et al. | |
| 6,304,263 | B1* | 10/2001 | Chiabrera et al. | 345/419 |
| 6,512,607 | B1 | 1/2003 | Windsor et al. | |
| 6,700,701 | B1* | 3/2004 | Son et al. | 359/443 |
| 2001/0001582 | A1 | 5/2001 | Walker | |
| 2003/0223499 | A1* | 12/2003 | Routhier et al. | 375/240.25 |
| 2004/0207918 | A1 | 10/2004 | Abe et al. | |
| 2004/0233541 | A1 | 11/2004 | Mori et al. | |
| 2005/0052593 | A1 | 3/2005 | Ting et al. | |
| 2006/0092510 | A1 | 5/2006 | Imafuku et al. | |
| 2006/0209066 | A1* | 9/2006 | Kubara et al. | 345/424 |
| 2007/0114425 | A1* | 5/2007 | Wong et al. | 250/370.09 |

FOREIGN PATENT DOCUMENTS

| DE | 4315194 | 11/1994 |
| EP | 0775935 | 5/1997 |
| WO | WO0017708 | 3/2000 |
| WO | WO2005059659 | 6/2005 |
| WO | WO2005081546 | 9/2005 |
| WO | WO2006103301 | 10/2006 |

OTHER PUBLICATIONS

International Search Report, Aug. 7, 2007.

* cited by examiner

Primary Examiner — Nasser Goodarzi
Assistant Examiner — Kyu Chae
(74) Attorney, Agent, or Firm — Robert D. Shedd; Richard LaPeruta

(57) ABSTRACT

A 3D image projection system has a display screen having an array of pixels, an array of pixel pyramids associated with the array of pixels, and a projector configured to project light onto the display screen.

14 Claims, 1 Drawing Sheet

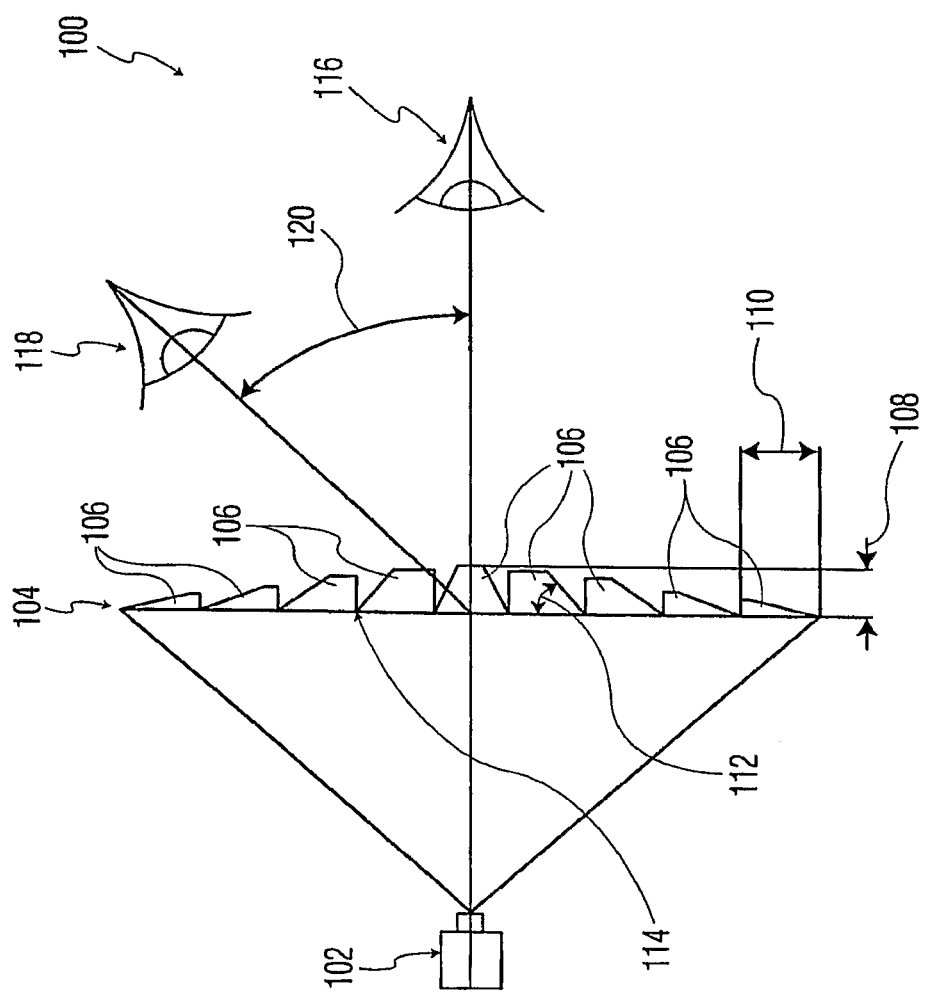

3D IMAGE PROJECTION SYSTEM

This application claims the benefit, under 35 U.S.C. §365 of International Application PCT/US2006/048321, filed Dec. 19, 2006, which was published in accordance with PCT Article 21(2) on Jun. 26, 2008 in English.

FIELD OF THE INVENTION

The invention relates generally to the display of 3D images. More specifically, the invention relates to 3D image projection systems.

BACKGROUND OF THE INVENTION

It is well known that a projected image may be enhanced with an appearance of depth by converting the projected image into a so-called 3D image. This is most often accomplished by optically polarizing the images which are to be viewed by a viewer's left eye differently than the images which are to be viewed by a viewer's right eye. The 3D effect is perceived by the viewer when the viewer views the polarized images though the use of polarized filter lenses, commonly configured as '3D viewing glasses' with a polarized filter for use with the left eye of the viewer and a differently polarized filter for use with the right eye of the viewer. When the 3D viewing glasses are used to view the 3D images, the left eye of the viewer sees only the light polarized appropriately for passage through the polarized filter associated with the left eye and the right eye of the viewer sees only the light polarized appropriately for passage through the polarized filter associated with the right eye of the viewer. The above described method of displaying 3D images is known as passive 3D viewing where the projector alternates the left eye information with the right eye information at double the typical frame rate and a screen/filter/polarizing blocker in front of the projector's lenses alternates the polarization of the projected image in such a way that the image of each eye passes through the corresponding polarizing filter of the pair of passive stereo glasses discussed above. An alternative to passive 3D viewing is active 3D viewing where each viewer wears glasses with LCD light shutters which work in synchronization with the projector so that when the projector displays the left eye image, the right eye shutter of the active stereo eyewear is closed, and vice versa. A problem with the above described methods of projecting a 3D image is that the viewer does not perceive the side depth view when the viewer moves his head around with respect to the projected image.

Another known method of producing a 3D image is through the use of multiple projectors, where each projector is typically located at different locations and is focused onto the same screen. In this configuration, each pixel of the display is able to emit light beams of varying color, intensity and direction, so that a viewer viewing a pixel from a first point of view will perceive a different output from that pixel than a person viewing the same pixel from a second point of view. While the system above is able to create a 3D image viewable in substantially full depth from a variety of view points, a system which requires multiple projectors to accomplish 3D image projection can be very costly and may have difficult issues with proper alignment and/or calibration between the multiple projectors.

Another known method of producing a 3D image is through the use of a pinhole array which typically incorporate a screen having pinholes through which projected light may pass. Each pinhole then appears as a point light source, displaying varying intensity and direction therefrom and the image being perceived as having depth when viewed from a prescribed position. However, pinhole array systems are known for having a single best viewer location. In other words, as the viewer moves about with respect to the pinhole array, the depth and intensity of the 3D image are degraded based upon even slight variations in location.

While there are many advanced methods of displaying 3D images, much room for improvement remains. It is therefore desirable to develop a lower cost 3D image projection system with the ability to view the projected 3D image from various view points.

SUMMARY OF THE INVENTION

A 3D image projection system has a display screen having an array of pixels, an array of pixel pyramids associated with the array of pixels, and a projector configured to project light onto the display screen.

BRIEF DESCRIPTION OF THE DRAWINGS

FIG. 1 is an orthogonal schematic top view illustration of a 3D image projection system according to the present invention.

DETAILED DESCRIPTION OF THE INVENTION

Referring now to FIG. 1 in the drawings, a 3D image projection system according the present invention is illustrated. 3D image projection system 100 comprises a projector 102 and a display screen 104. Projector 102 is configured to project images onto screen 104 at very high refresh rates, with faster rates being better. To achieve a good 3D image result, projector 102 should display images at a refresh rate of 2-4 times faster than the typical refresh rate used by currently available imagers of multi-projector 3D image projection systems so as to provide two or more view images per typical frame rate (30 frames per second). In other words, projector 102 is capable of an image refresh rate of at least about 60 frames per second. The purpose of having such high refresh rates is to provide the same amount of image data to the screen 104 as a multi-projector system, but without the need for more than a single projector. As such, the 3D image projection system according to the invention includes embodiments where rates are at least about 75 frames per second, at least about 90 frames per second, and at least about 120 frames per second. Although increased rates are more desirable from a performance perspective, one must balance (for their particular application) the performance gains with higher rates versus the likely increase in data content and expense associated therewith.

The structural aspects of the invention will now be described. The screen 104 comprises an array of pixel contoured surface elements such as pixel pyramids 106, one pixel pyramid associated with each individual pixel (not shown) of the display screen 104. Light received from the projector is transmitted from each pixel to its associated pixel pyramid and then transferred out of screen 104 for viewing. The pixel contoured surface elements or pixel pyramids are gradually taller from left and right edges to the center of screen 104 such that the pixel pyramids 106 located most central on the display 104 are tallest. The height of the tallest pixel pyramid represents the highest allowable focal depth 108 of the display screen 104. The base width 110 of each pixel pyramid is substantially equal to and substantially corresponds to the width of the pixels they cover. Each pixel pyramid 106 has a side angle 112 at which the side of each pixel pyramid 106 is formed with respect to being parallel to a base face 114 of the display upon which the pixel pyramids are affixed to or integral to. Each or some of the pixel pyramids 106 can have a top surface which is parallel to a base face 114 of the display. The pixel pyramids 106 are constructed of materials suitable for providing Lambertian (or so-called Gain 1) radiation, coated to provide Lambertian (or so-called Gain 1) radiation, and/or etched in a manner to provide Lambertian (or so-called Gain 1) radiation so as to distribute light at various angles and in various intensities. More specifically, the Lambertian radiation pattern provides for maximal viewing intensity when the viewing surface if viewed perpendicularly and provides for submaximal viewing intensity when viewing obliquely (decreasing as the viewing angle 120 approaches 90 degrees). The above described 3D image projection system 100 is capable of projecting a 3D image easily viewed by a first viewer 116 and a second viewer 118 who is at least angularly displaced by a viewing angle 120. In alternative embodiments (not shown), the 3D image quality and side depth view may be increased by increasing the number of projectors and/or by adding known polarization techniques to the system 100 (as described previously).

The foregoing illustrates only some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A 3D image projection system comprising:
   display screen having an array of pixels; and
   an array of pixel contoured surface elements associated with the array of pixels, each of the pixel contoured surface elements has a peak height that extends from a base face plane of the display screen toward a viewer side of the display screen;
   wherein the array of pixel contoured surface elements is configured such that the peak height of the pixel contoured surface elements gradually increases from the left and right edges of the display screen toward the center of the display screen from one pixel contoured surface element to the next;
   wherein the array of pixel contoured surface elements is configured such that a side angle of the pixel contoured surface elements gradually increases from the edges of the display screen toward the center of the display screen.

2. The 3D image projection system according to claim 1, wherein light is transmitted from a pixel to an associated pixel contoured surface elements.

3. The 3D image projection system according to claim 1, wherein the pixel contoured surface elements are constructed so as to emit light in a Lambertian radiation pattern.

4. The 3D image projection system according to claim 1, wherein the pixel contoured surface elements are pixel pyramids.

5. A 3D image projection system, comprising:
   a display screen, including:
   an array of pixels; and
   an array of pixel pyramids associated with array of pixel associated with the array of pixels; and
   a projector configured to project light onto the display screen; and
   wherein each of the pixel pyramids has a peak height that extends from a base face plane of the display screen toward a viewer side of the display screen;
   wherein the array of pixel pyramids is configured such that the peak height of the pixel pyramids gradually increases from the left and right edges of the display screen toward the center of the display screen from one pixel pyramid to the next;
   wherein the array of pixel pyramids is configured such that a side angle of the pixel pyramids gradually increases from the edges of the display screen toward the center of the display screen.

6. The 3D image projection system according to claim 5, wherein light is transmitted from a pixel to an associated pixel pyramid.

7. The 3D image projection system according to claim 5, wherein the pixel pyramids are constructed so as to emit light in a Lambertian radiation pattern.

8. The 3D image projection system according to claim 5, wherein the projector is configured to project at least about 60 frames per second.

9. The 3D image projection system according to claim 5, wherein the projector is configured to project at least about 75 frames per second.

10. The 3D image projection system according to claim 5, wherein the projector is configured to project at least about 90 frames per second.

11. The 3D image projection system according to claim 5, wherein the projector is configured to project at least about 120 frames per second.

12. The 3D image projection system according to claim 5, further comprising: a plurality of projectors configured to project light onto the display screen.

13. The 3D image projection system according to claim 5, further comprising: an active polarization system for polarizing the projected light.

14. The 3D image projection system according to claim 5, further comprising: a passive polarization system for polarizing the projected light.

* * * * *